United States Patent
Chen et al.

(10) Patent No.: US 10,193,965 B2
(45) Date of Patent: Jan. 29, 2019

(54) MANAGEMENT SERVER AND OPERATION METHOD THEREOF AND SERVER SYSTEM

(71) Applicants: ThroughTek Technology (Shen-Zhen) Co., Ltd., Longhua New District, Shenzhen (CN); ThroughTek Co., Ltd., Taipei (TW)

(72) Inventors: I-Fan Chen, Taipei (TW); Min-Neng Chang, Taipei (TW)

(73) Assignees: ThroughTek Technology (Shenzhen) Co., Ltd., Shenzhen (CN); ThroughTek Co., Ltd., Taipei (TW)

( * ) Notice: Subject to any disclaimer, the term of this patent is extended or adjusted under 35 U.S.C. 154(b) by 101 days.

(21) Appl. No.: 14/992,176

(22) Filed: Jan. 11, 2016

(65) Prior Publication Data

US 2016/0234299 A1 Aug. 11, 2016

(30) Foreign Application Priority Data

Feb. 5, 2015 (TW) .............................. 104103835 A

(51) Int. Cl.
| | |
|---|---|
| G06F 15/173 | (2006.01) |
| H04L 29/08 | (2006.01) |
| H04L 29/06 | (2006.01) |
| G06F 17/30 | (2006.01) |

(52) U.S. Cl.
CPC .... *H04L 67/1014* (2013.01); *G06F 17/30377* (2013.01); *G06F 17/30864* (2013.01); *H04L 67/101* (2013.01); *H04L 67/42* (2013.01)

(58) Field of Classification Search
CPC ......... G06F 17/30377; G06F 17/30864; H04L 67/101; H04L 67/1014; H04L 67/42

USPC ......................................................... 709/226
See application file for complete search history.

(56) References Cited

U.S. PATENT DOCUMENTS

| 6,263,368 | B1 * | 7/2001 | Martin ................... H04L 29/06 709/224 |
| 2005/0114480 | A1 * | 5/2005 | Ramamoorthy .... H04L 67/1008 709/220 |
| 2005/0198200 | A1 * | 9/2005 | Subramanian .......... H04L 41/50 709/218 |

(Continued)

FOREIGN PATENT DOCUMENTS

| CN | 103747073 A | 4/2014 |
| TW | 201433124 A1 | 8/2014 |

OTHER PUBLICATIONS

Taiwan office action dated Oct. 11, 2016 in corresponding Taiwan (R.O.C.) application TW104103835, 7 pp. in Chinese.

(Continued)

*Primary Examiner* — Phuoc H Nguyen
(74) *Attorney, Agent, or Firm* — Juan Carlos A. Marquez; Marquez IP Law Office, PLLC

(57) ABSTRACT

A management server includes a storage unit, a sub-server and a load balancing unit. The storage unit stores a datum. The sub-server is corresponded to the storage unit and obtains the datum from the storage unit according to a request signal. The load balancing unit is coupled to the sub-server and receives the request signal from the client. The load balancing unit distributes the request signal to the corresponding sub-server according to a request number of the request signal. The management server outputs the datum obtained by the sub-server from the storage unit according to the request number.

8 Claims, 5 Drawing Sheets

(56) References Cited

U.S. PATENT DOCUMENTS

| | | | |
|---|---|---|---|
| 2007/0184903 A1* | 8/2007 | Liu | A63F 13/12 463/42 |
| 2008/0127199 A1* | 5/2008 | Miki | G06F 3/0613 718/105 |
| 2012/0054450 A1* | 3/2012 | Doering | G06F 13/4204 711/146 |
| 2013/0332608 A1* | 12/2013 | Shiga | G06F 9/5088 709/226 |
| 2014/0047454 A1* | 2/2014 | Oliver | G06F 9/5083 718/104 |

OTHER PUBLICATIONS

Chinese office action dated Nov. 16, 2017, in corresponding Chinese (P.R.C.) application CN201510523952.6, 8 pp. in Chinese.

* cited by examiner they may store in the database. In this case, the time for searching the corresponding data in the database and sending the data back to the client may be spend much longer, that means, the client may waste much more time on waiting the feedback of the server. Therefore, the processing efficiency of the server and the speed for searching the data and sending the data back to the client needs improvement.

MANAGEMENT SERVER AND OPERATION METHOD THEREOF AND SERVER SYSTEM

CROSS REFERENCE TO RELATED APPLICATION

This application claims the priority benefit of Taiwan Patent Application Serial Number 104103835, filed on. Feb. 5, 2015, the full disclosure of which is incorporated herein by reference.

BACKGROUND

Technical Field

This disclosure generally relates to a server and an operation method thereof and, more particularly, to a management server and an operation method thereof and a server system.

Related Art

Since the advances in the internet technology, many electronic products (such as clients) can connect to the server through the Internet and search the data stored in the database of the server. The server may search the data in the database according to a message content provided from the client, and send the data, obtained from the database, back to the corresponding client. As the number of clients increases, the message contents provided from the clients increase, and the service requirements provided by the server may also increase.

Owing to the more the clients and the more the requirement for searching the message contents, the more the data may store in the database. In this case, the time for searching the corresponding data in the database and sending the data back to the client may be spend much longer, that means, the client may waste much more time on waiting the feedback of the server. Therefore, the processing efficiency of the server and the speed for searching the data and sending the data back to the client needs improvement.

SUMMARY

The disclosure provides a management server and an operation method thereof and a server system, thereby balancing the amount of the connection to balance the efficiency of the system and decrease the time for searching the data.

The disclosure provides a management server. The data management server includes a storage unit, a sub-server and a load balancing unit. The storage unit stores a datum. The sub-server corresponds to the storage unit and obtains the datum from the storage unit according to a request signal, wherein the request signal is generated by a client and the request signal has a request number. The load balancing unit is coupled to the sub-server and receives the request signal from the client. The load balancing unit distributes a request signal to the corresponding sub-server according to the request number. The management server outputs the datum obtained by the sub-server from the storage unit according to the request number.

The disclosure further provides an operation method of a management server. The operation method of the management server includes the following steps: receiving a request signal from a client, wherein the request signal has a request number; distributing the request number to a sub-server according to the request number; obtaining a datum by the sub-server from a storage unit according to the request number, wherein the storage unit is corresponding to the sub-server; and outputting the datum according to the request number.

The disclosure further provides a server system. The server system includes a client and a management server. The client generates a request signal, wherein the request signal has a request number. The management server includes a storage unit, a sub-server and a load balancing unit. The storage unit stores a datum. The sub-server corresponds to the storage unit and obtains the datum from the storage unit according to the request signal. The load balancing unit is connected to the client and coupled to the sub-server, the load balancing unit receives the request signal from the client, and distributes a request signal to the corresponding sub-server according to the request number. The management server outputs the datum obtained by the sub-server from the storage unit according to the request number.

According to the management server and the operation method thereof and the server system in the exemplary embodiments, the load balancing unit distributes the request signal to the corresponding sub-server according to the request number of the request signal, such that the sub-server obtains the datum from the corresponding storage unit, and then the management server (i.e. the load balancing unit or the sub-server) outputs the datum from the corresponding storage unit according to the request number. Therefore, the amount of the connection may be balanced to balance an efficiency of the system and decrease a time for searching the data.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
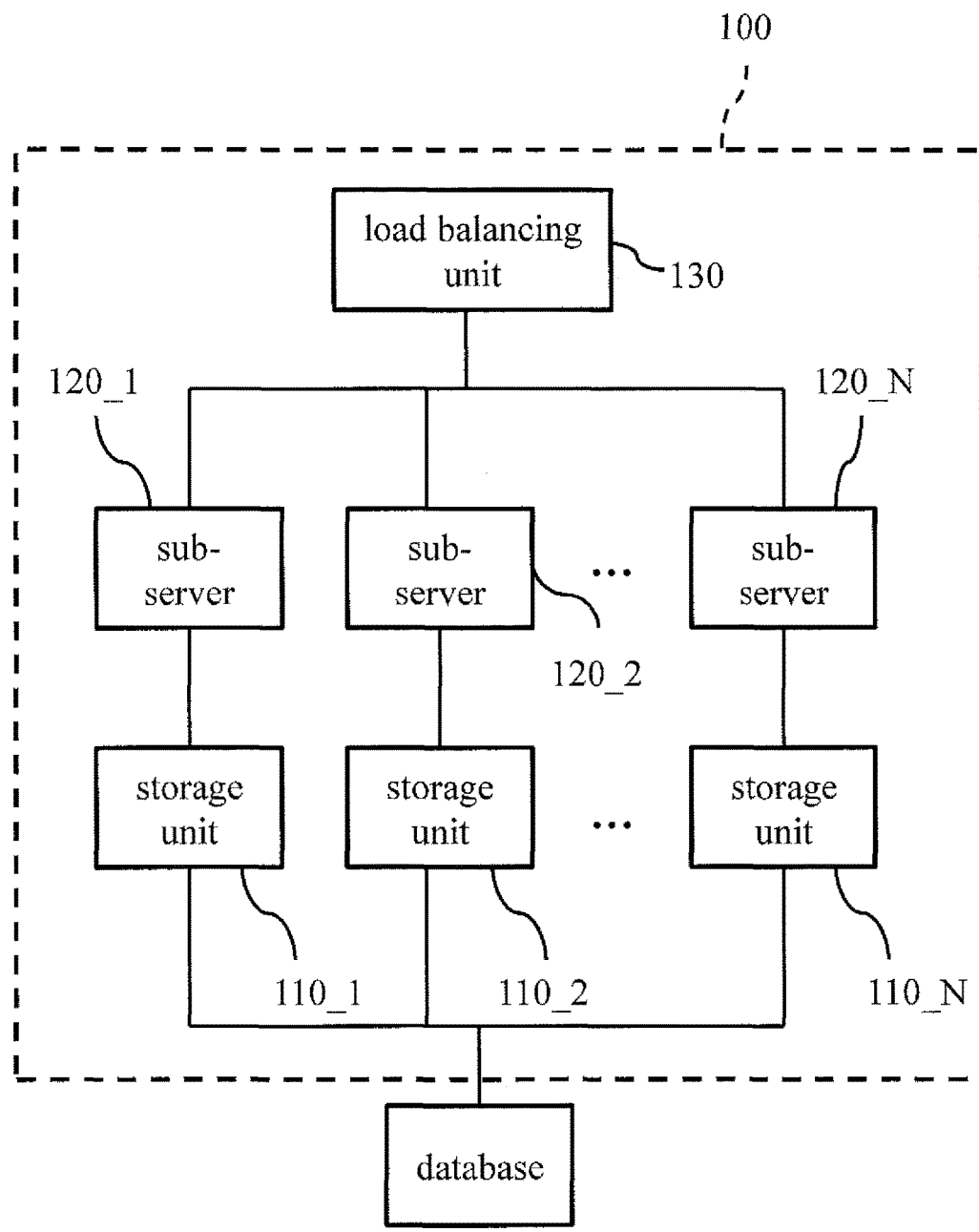
FIG. 1 shows a schematic diagram of the management server according to a first exemplary embodiment of the disclosure.

FIG. 1 shows a schematic diagram of the management server according to a first exemplary embodiment of the disclosure. The management server 100 includes a plurality of storage units 110_1 to 110_N, a plurality of sub-servers 120_1 to 120_N and a load balancing unit 130.

Each of the storage units 110_1 to 110_N stores a datum, and N is a positive integer greater than 1. The storage units 110_1 to 110_N may be, for example, a form for storing data, such as cache with entity or block of a database without entity.

The database is used to store all the data of the management server 100 and unify all the data stored in the storage units 110_1 to 110_N. When a new datum is written in or updated, the database may distribute the datum to each of the storage units 110_1 to 110_N. In the embodiment, the datum stored in each of the storage units 110_1 to 110_N may be, for example, a portion of all the data stored in the database. That is, all the data stored in the database may be synchronized and uniformly distributed to each of the storage units 110_1 to 110_N. For example, if the quantity of the storage units 110_1 to 110_N is ten, the data quantity stored in the each of the storage units 110_1 to 110_10 respectively is the 1/10 data quantity of the database, or all the data of the database may be divided into ten blocks to store in the corresponding storage unit. The other embodiments are similar to the previous ones, and the description may be referred to the previous embodiment. The datum stored in each of the storage units 110_1 to 110_N may also been updated to be all the same, part of the same, or all different according to the using requirement.

Each of the sub-servers 1201 to 120_N respectively corresponds to the storage units 10_1~110_N and obtains the datum from the storage units according to a request signal. In the embodiment, each of the sub-servers 120_1 to 120_N may be, for example, an entity or a virtual server device. Wherein, owing to the each of the sub-servers 120_1 to 120_N is respectively corresponds to the each of the storage units 110_1 to 110_N, the sub-servers may obtains the datum from the storage units one by one.

For example, the sub-server 120_1 corresponds to the storage unit 110_1, and the sub-server 120_1 may obtain the datum requested from the storage unit 110_1 according to the corresponding request signal. The sub-server 120_2 corresponds to the storage unit 110_2, and the sub-server 120_2 may obtain the datum requested from the storage unit 110_2 according the corresponding request signal. The other embodiments are similar to the previous ones, and the description may be referred to the previous embodiment. In FIG. 1, the sub-servers 120_1 to 120_N are separated from the storage units 110_1 to 110_N, and it is not limited to the disclosure. The storage units 110_1 to 110_N may also be built-in the sub-servers 120_1 to 120_N.

Additionally, the sub-servers 120_1 to 120_N may connect to the database periodically or non-periodically so as to update the datum stored in the storage units 110_1~110_N at any time. Or, when a new data is added, deleted or updated in the database, the sub-servers 120_1 to 120_N may connect to the database immediately so as to update the datum stored in the storage units 110_1~110_N at any time.

The load balancing unit 130 is coupled to the sub-servers 120_1 to 120_N and receives the request signal from a client. The request signal is generated by the client, and the request signal may include a request number. The request number may be, for example, a unique identification (UID) which formed as MAC address or formed as random string by English words, numerals or symbols.

When the load balancing unit 130 receives the request signal, the load balancing unit 130 can also obtain the request number in the request signal and distributes the request signal to the corresponding sub-servers 120_1 to 120_N according to the request number.

In the embodiment, a manner for distributing the request number is that request number is analyzed by using a mathematics method such as functional operation, and the foremost number or the last number of the analyzed request number is used.

For example, it is assumed that the quantity of the sub-servers is ten, such as the sub-servers 120_1~120_10. When the foremost number or the last number of the request number obtained by the load balancing unit 130 is "1", the load balancing unit 130 may distribute the request signal corresponding to the request number "1" to the corresponding sub-server 120_1. When the foremost number or the last number of the request number obtained by the load balancing unit 130 is "2", the load balancing unit 130 may distribute the request signal corresponding to the request number "2" to the corresponding sub-server 120_2.

The other embodiments that the foremost number or the last number of the request number obtained by the load balancing unit 130 is "3" to "9" are similar to the previous ones, and the description may be referred to the previous embodiment. When the foremost number or the last number of the request number obtained by the load balancing unit 130 is "0", the load balancing unit 130 may distribute the request signal corresponding to the request number "0" to the corresponding sub-server 120_10.

Then, the sub-servers 120_1 to 120_N obtain the datum from the corresponding storage units 110_1 to 110_N according to the received request signal. Afterward, the management server 100 outputs the above-mentioned datum to the client according to the request signal, such that the client may obtain the datum requested.

Further, in one embodiment, after the sub-servers 120_1 to 120_N obtain the datum from the corresponding storage units 110_1 to 110_N, the sub-servers 120_1 to 120_N may feed the datum obtained from the storage units 110_1 to 110_N back to the load balancing unit 130, such that the management server 100 outputs the above-mentioned datum to the client through the load balancing unit 130.

In another embodiment, the sub-servers 120_1 to 120_N may directly output the datum obtained from the storage units 110_1 to 110_N to the client. That is, the management server 100 may output the above-mentioned datum to the client through the sub-servers 120_1 to 120_N, so as to increase the speed for sending the datum back.

According to the above-mentioned description, the load balancing unit 130 distributes the request signal to the corresponding sub-servers 120_1 to 120_N and then the sub-servers 120_1 to 120_N only need to obtain the datum from the corresponding storage units 110_1 to 110_N. Additionally, the datum stored in the storage units may be classified and stored in advance, such that after the sub-servers 120_1 to 120_N receive the request signal, sub-servers 120_1 to 120_N may obtain the datum from the corresponding storage units 110_1 to 110_N quickly. Therefore, the time for searching the datum may be decrease effectively.

Further, when the sub-servers 120_1 to 120_N receive the request signal, the sub-servers 120_1 to 120_N may capture a predetermined request number stored in the storage units 110_1 to 110_N, and then compare the request number of the request signal with the predetermined request number, so as to determine whether the request signal received by the sub-servers 120_1 to 120_N is legal.

When the request number is equal to the predetermined request number, it means that the request signal is legal, the sub-servers 120_1~120_N perform the corresponding process according to the request signal, i.e. the sub-servers 120_1 to 120_N obtain the datum from the storage units 110_1 to 110_N. If the request number is not equal to the predetermined request number, it means that the request signal is illegal, and then the sub-servers 120_1 to 120_N do not perform the corresponding process. Afterward, the sub-servers 120_1 to 120_N may wait for the next request signal distributed by the load balancing unit 130 and then perform the following process. Therefore, an efficiency decrease of the management server 100 related to an illegal request signal can be avoided.

In the embodiment of FIG. 1, the quantity of the sub-servers 1201 to 120_N and the storage units 110_1 to 110_N is greater than one, and it is not limited to the disclosure. The quantity of the sub-server and the storage unit may also respectively be one, and the embodiment of the sub-server and the storage unit may be referred to the above-mentioned description, and the description is omitted.

Additionally, the quantity of the request signal and the request number thereof and the predetermined request number is one, and it is not limited to the disclosure. The quantity of the request signal and the request number thereof and the predetermined request number may also be two or more than two. For example, when the quantity of the request signal and the request number thereof is two, the quantity of the predetermined request number should be two. When the quantity of the request signal and the request number thereof is three, the quantity of the predetermined request number should be three. The other embodiments are similar to the previous ones, and the description may be referred to the previous embodiment.

Otherwise, when the quantity of the request signal is two, the two request signals may be outputted by the different clients. The other embodiments are similar to the previous ones, and the description may be referred to the previous embodiment. In other embodiments, multiple of the request signals and the request numbers thereof and the predetermined request numbers may be referred to the description of the above-mentioned embodiment, and the description is omitted.

Moreover, the request signal may has, for example, one request number, and it is not limited to the disclosure. The request signal may also has, for example, two or more than two request numbers at the same time. The quantity of the request number may correspond to the quantity of the predetermined request number. For example, when the quantity of the request number is two, the quantity of the predetermined request number is two. When the quantity of the request number is three, the quantity of the predetermined request number is three. The other embodiments are similar to the previous ones, and the description may be referred to the previous embodiment. The embodiments of the request signals including two or more than two request numbers at the same time may be referred to the description of the above-mentioned embodiment, and the description is omitted.

Additionally, in the above-mentioned embodiment, the request number is analyzed by using the functional operation to distribute the request signal, and it is not limited to the disclosure. The request number may be analyzed by using the other manners similar to the functional operation to distribute the request signal, and the other manners for analyzing the request number are within the scope of the disclosure. The operation of the other manners may be referred to the above-mentioned description, and the description is omitted.

Figure 2:
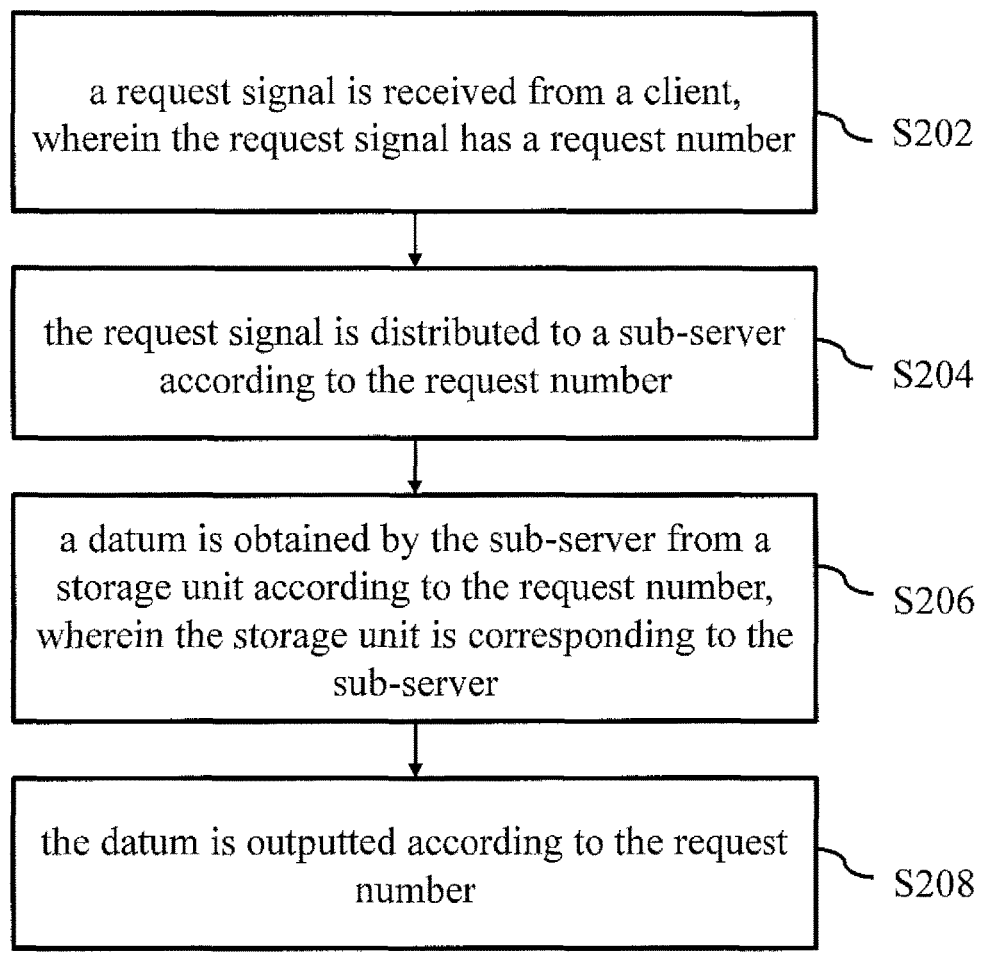
FIG. 2 shows a flowchart of the operation method of the management server according to a second exemplary embodiment of the disclosure.

According to the above-mentioned description, it may sum up an operation method of a management server. FIG. 2 shows a flowchart of the operation method of the management server according to a second exemplary embodiment of the disclosure.

In the step S202, a request signal is received from a client, wherein the request signal has a request number. In the step S204, the request signal is distributed to a sub-server according to the request number. In the step S206, a datum is obtained by the sub-server from a storage unit according to the request number, wherein the storage unit is corresponding to the sub-server. In the step S208, the datum is outputted according to the request number. In the embodiment, the datum stored in the storage unit is a portion of all data stored in a database of the management server and all data stored in the storages are different.

Figure 3:
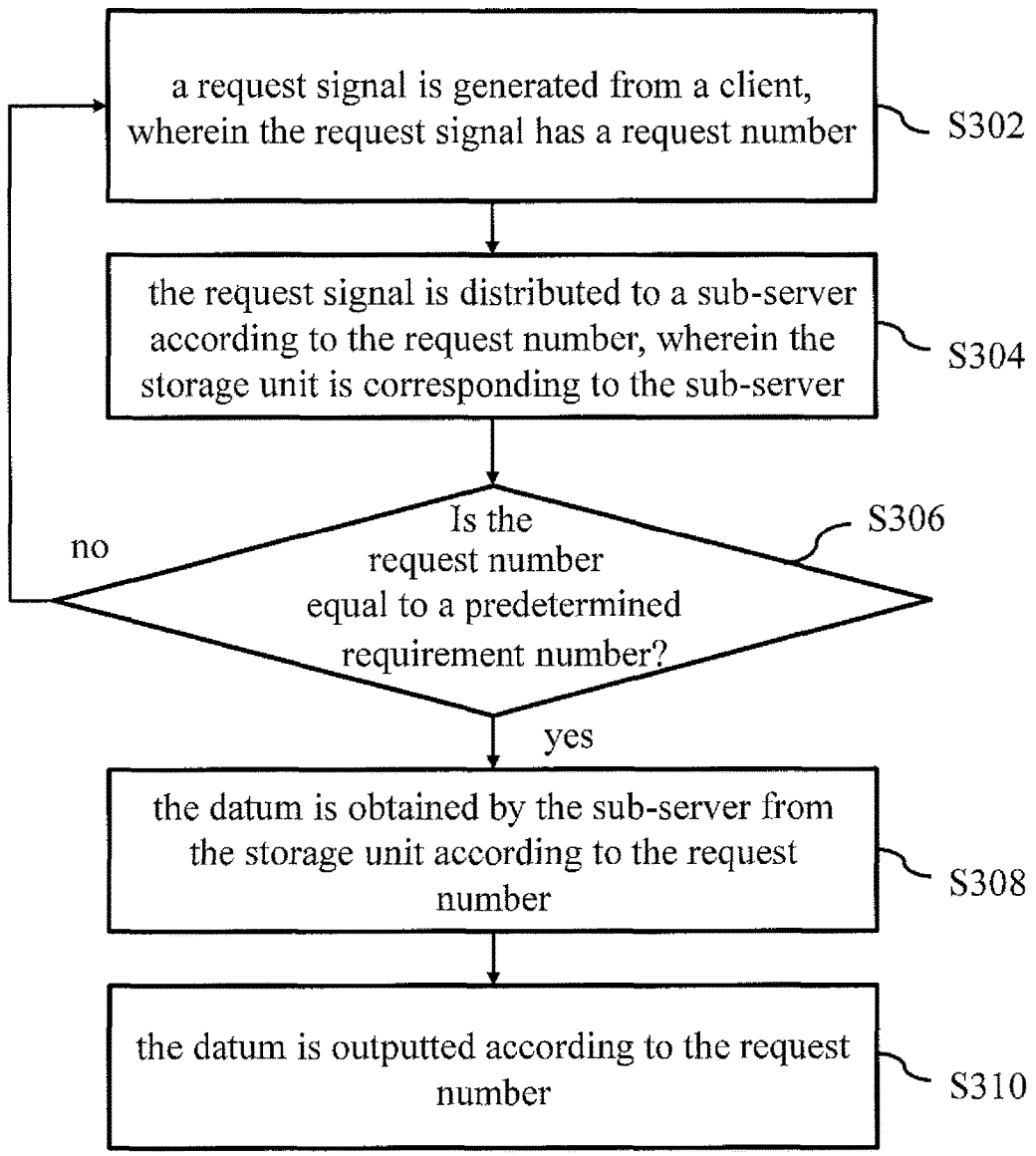
FIG. 3 shows a flowchart of the operation method of the management server according to a third exemplary embodiment of the disclosure.

FIG. 3 shows a flowchart of the operation method of the management server according to a third exemplary embodiment of the disclosure. In the step S302, a request signal is generated from a client, wherein the request signal has a request number. In the step S304, the request signal is distributed to a sub-server according to the request number, wherein the storage unit is corresponding to the sub-server. In the step S306, the request number is compared with a predetermined request number, i.e. it is determined that whether the request number is equal to a predetermined request number.

When the request number is not equal to the predetermined request number, the process returns to the step S302, the request signal is received from the client to perform the following process. When the request number is equal to the predetermined request number, the process goes to the step S308, the datum is obtained by the sub-server from the storage unit according to the request number. In the step S310, the datum is outputted according to the request number. In the embodiment, the datum stored in the storage unit is a portion of all data which are stored in a database of the management server and all data stored in the storages are different.

Figure 4:
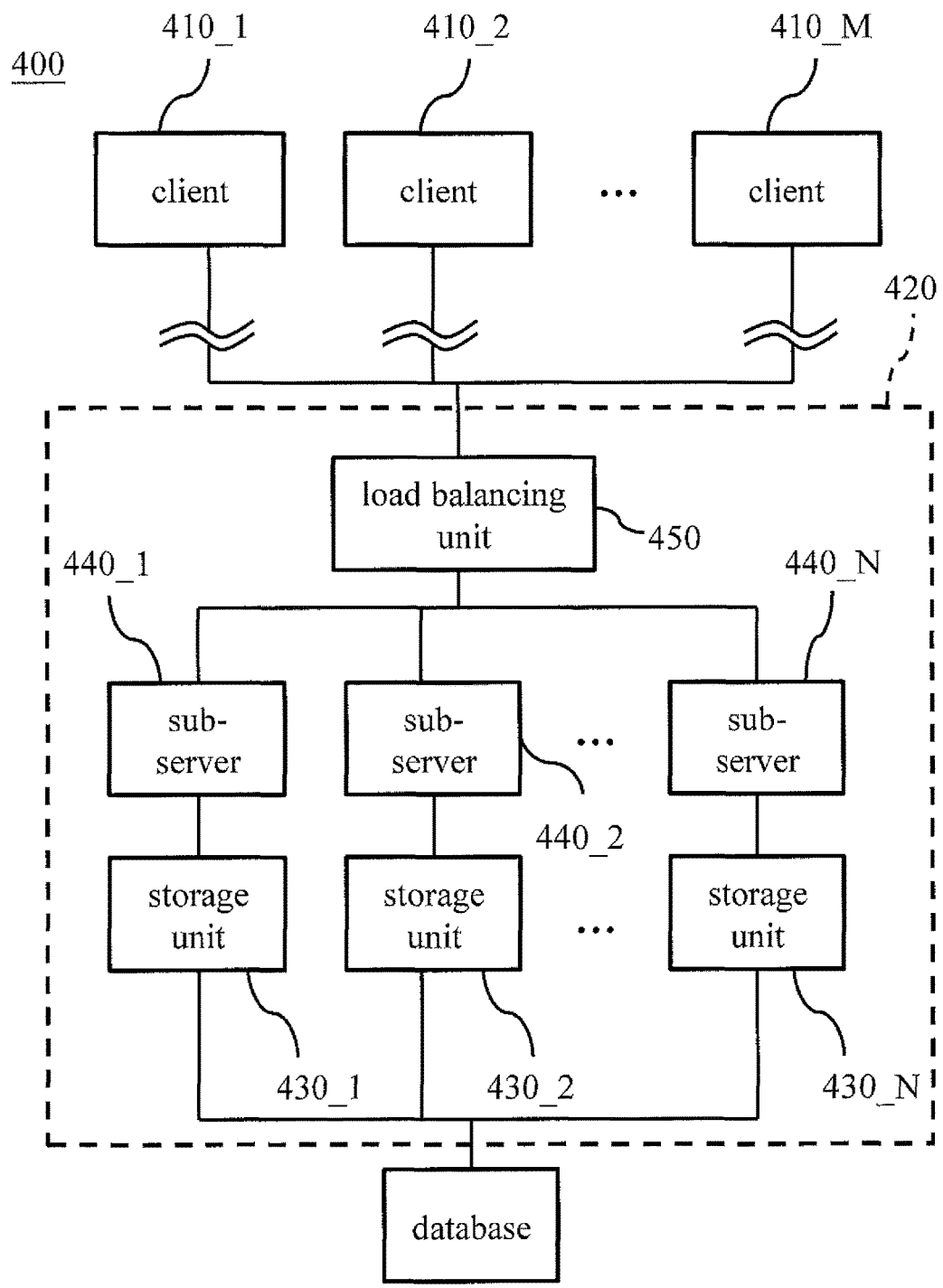
FIG. 4 shows a schematic diagram of the server system according to a fourth exemplary embodiment of the disclosure.

FIG. 4 shows a schematic diagram of the server system according to a fourth exemplary embodiment of the disclosure. The server system 400 includes a plurality of clients 410_1~410_M and a management server 420, wherein M is a positive integer greater than 1.

Each of the client 410_1~410_M may generate a request signal, wherein the request signal has a request number. Each of the client 410_1~410_M may include a plurality of request numbers, and each of the request numbers may be, for example, a unique identification (UID) which formed as MAC address or formed as random string by English words, numerals or symbols. Additionally, each of the client 410_1~410_M may be, for example, a mobile phone, a computer or any hardware device equipped with network function, such as smart appliance or wearable device.

The management server 420 includes a plurality of storage units 430_1 to 430_N, a plurality of sub-servers 440_1 to 440_N and a load balancing unit 450, and N is n positive integer greater than 1. The management server 420, the storage units 430_1 to 430_N, the sub-servers 440_1 to 440_N and the load balancing unit 450 are respectively the same as or similar to the management server 100, the storage units 110_1 to 110_N, the sub-servers 1201 to 120_N and the load balancing unit 130 as shown in FIG. 1 and may be referred to the description of the embodiment in FIG. 1, and the description is omitted.

Additionally, the load balancing unit 450 is, for example, connected to the client 410_1 to 410_M through the internet, bluetooth or other connection manners, so as to receive the request signals generated by the client 410_1 to 410_M and distribute the request signals, such that the corresponding sub-server 440_1 to 440_N perform the following process. In one embodiment, the management server 420 may further output the datum, obtained by the sub-servers 440_1 to 440_N from the storage unit 430_1 to 430_N, to the corresponding client 410_1 to 410_M through the load balancing unit 450 according to the request number. Or, in another embodiment, the management server 420 may output the datum to the client 410_1 to 410_M by itself through the corresponding sub-server 440_1 to 440_N. Therefore, the efficiency of the system is balanced and a time for searching the data is decreased.

Additionally, the sub-servers 440_1 to 440_N may also compare the request number with the corresponding predetermined request number so as to determine whether the request number is legal. The above-mentioned comparing manner may be referred to the embodiment of the sub-servers 120_1~120_N in FIG. 1 and the description is omitted. Therefore, the efficiency of the management server 420 decreased by the request signal which is not legal may be avoided.

In the embodiment of FIG. 4, the quantity of the sub-servers 440_1 to 440_N and the storage units 430_1 to 430_N is greater than one, and it is not limited to the disclosure. The quantity of the sub-server and the storage unit may also respectively be one, and the embodiment of the sub-server and the storage unit may be referred to the above-mentioned description, and the description is omitted.

Additionally, the quantity of the request signal and the request number thereof and the predetermined request number is one, and it is not limited to the disclosure. The quantity of the request signal and the request number thereof and the predetermined request number may also be two or more than two. For example, when the quantity of the request signal and the request number thereof is two, the quantity of the predetermined request number should be two. When the quantity of the request signal and the request number thereof is three, the quantity of the predetermined request number should be three. The other embodiments are similar to the previous ones, and the description may be referred to the previous embodiment. Furthermore, when the quantity of the request signal is two, the two request signals may be outputted by the different clients. The other embodiments are similar to the previous ones, and the description may be referred to the previous embodiment. The embodiments of two or more than two the request signals and the request numbers thereof and the predetermined request numbers may be referred to the description of the above-mentioned embodiment, and the description is omitted.

Moreover, the request signal may has, for example, one request number, and it is not limited to the disclosure. The request signal may also has, for example, two or more than two request numbers at the same time. The quantity of the request number may correspond to the quantity of the predetermined request number. For example, when the quantity of the request number is two, the quantity of the predetermined request number is two. When the quantity of the request number is three, the quantity of the predetermined request number is three. The other embodiments are similar to the previous ones, and the description may be referred to the previous embodiment. The embodiments of the request signals including two or more than two request numbers at the same time may be referred to the description of the above-mentioned embodiment, and the description is omitted.

Figure 5:
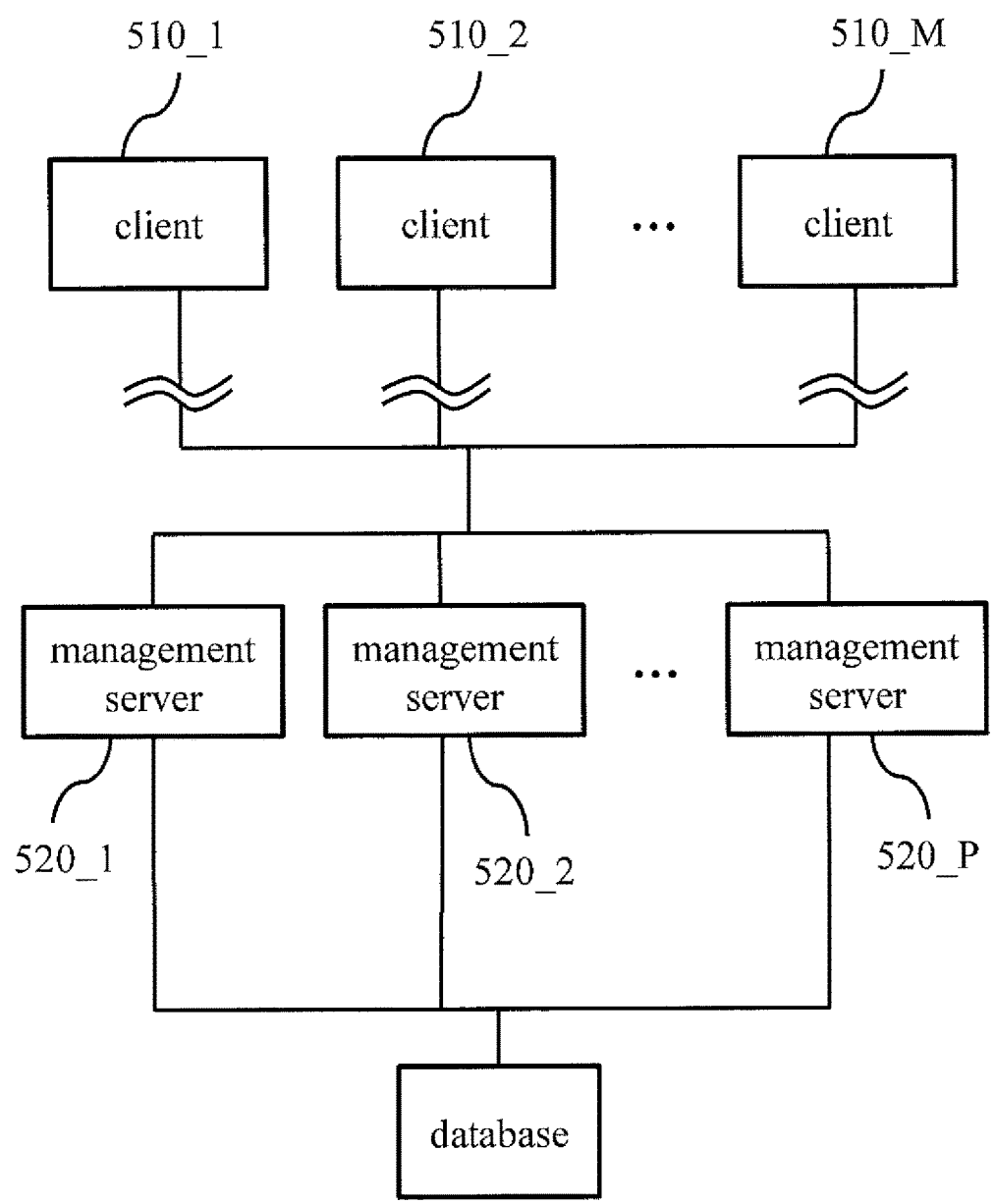
FIG. 5 shows a schematic diagram of the server system according to a fifth exemplary embodiment of the disclosure.

FIG. 5 shows a schematic diagram of the server system according to a fifth exemplary embodiment of the disclosure. The server system 500 includes a plurality of clients 510_1 to 510_M and a plurality management servers 520_1 to 520_P, wherein M and P are a positive integer greater than 1. In the embodiment, the clients 510_1 to 510_M in FIG. 5 are the same as or similar to the clients 410_1 to 410_M and the operation of the clients 510_1 to 510_M may be referred to the description of the embodiment in FIG. 4 and the description is omitted.

Additionally, the management servers 520_1 to 520_P and internal elements and the related operation thereof are the same as or similar to the management server 420, and the operation of the management servers 520_1 to 520_P may also be referred to the description of the embodiment in FIG. 4 and the description is omitted.

In the embodiment, the management servers 520_1 to 520_P may be, for example, disposed in different places or countries. For the convenience of description, the following description only uses, for example, the client 510_1. The other embodiments of the clients 510_2 to 510_M are similar to the previous ones, and the description may be referred to the previous embodiment. The client 510_1 may generate the request signal and transmit this request signal to the management server 520_1 to 520_P at the same time. The management server 520_1 to 520_P obtains the datum corresponding to the request signal according to the request number. Then, the client 510_1 may receive the datum from one of the management server 520_1 to 520_P which is the quickest response, and perform the following process. Therefore, the datum requested by the client may be searched effectively and quickest.

Additionally, the sub-servers of the management server 520_1 to 520_P may connect to the database periodically or non-periodically so as to update the datum stored in the storage units of the management servers 520_1 to 520_P at any time. Or, when a new data is added or updated in database, the sub-servers of the management server 520_1 to 520_P may connect to the database immediately so as to update the datum stored in the storage units of the management server 520_1 to 520_P at any time. The data stored in the storage units of the management servers 520_1 to 520_P are the same. For example, the data stored in the storage units 430_1 of the management servers 520_1 to 520_P are the same. The data stored in the storage units 430_2 of the management servers 520_1 to 520_P are the same. The other embodiments are similar the previous ones, and the description may be referred to the previous embodiment.

According to the management server and the operation method thereof and the server system of the above-mentioned embodiments, the load balancing unit distributes the request signal to the corresponding sub-server according to the request number of the request signal, such that the sub-server obtains the datum from the corresponding storage unit, and then the management server outputs the datum from the corresponding storage unit according to the request number (i.e. through the load balancing unit or the sub-server). Therefore, the quantity of the connection may be balanced to balance an efficiency of the system and decrease the time for searching the data. Additionally, the sub-server further compares the request number with the predetermined request number to determine whether the request signal is legal. Therefore, an efficiency decrease of the management server related to an illegal request signal can be avoided.

Although the disclosure has been explained in relation to its preferred embodiment, it does not intend to limit the disclosure. It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A server system, comprising:
    a client, generating a request signal, wherein the request signal has a request number; and
    a management server, comprising:
        a plurality of storage units, respectively storing a datum, the datum stored in each of the storage units is a portion of all data which are stored in a database of the management server;
        a sub-server, corresponding to the storage units and configured to obtain the datum from the storage unit in response to the request signal; and
        a load balancing unit, operatively connected to the client and coupled to the sub-server, the load balancing unit being configured to receive the request signal from the client and distribute the request signal to the corresponding sub-server in response to the request number;
        wherein, the management server outputs the datum obtained by the sub-server from the storage unit according to the request number;
        comparing the request number with a predetermined request number;
        obtaining the datum by the sub-server from the storage unit according to the request number when the request number is equal to the predetermined request number; and
        returning to the step of receiving the request signal when the request number is not equal to the predetermined request number.

2. The server system as claimed in claim 1, wherein the sub-server compares the request number with a predetermined request number to obtain the datum from the storage unit accordingly.

3. The server system as claimed in claim 1, wherein the sub-server is connected to the database to update the datum stored in the storage unit.

4. The server system as claimed in claim 1, wherein the management server outputs the datum to the client through the load balancing unit or the sub-server.

5. A management server, comprising:
    a plurality of storage units, respectively storing a datum, the datum stored in each of the storage units is a portion of all data which are stored in a database of the management server;
    a sub-server, corresponding to the storage units and configured to obtain the datum from the storage unit in response to a request signal, wherein the request signal is generated by a client and the request signal has a request number; and a load balancing unit, coupled to the sub-server, the load balancing unit being configured to receive the request signal from the client and distribute the request signal to the corresponding sub-server in response to the request number;
        wherein, the management server outputs the datum obtained by the sub-server from the storage unit according to the request number;
        comparing the request number with a predetermined request number;
        obtaining the datum by the sub-server from the storage unit according to the request number when the request number is equal to the predetermined request number; and
        returning to the step of receiving the request signal when the request number is not equal to the predetermined request number.

6. The management server as claimed in claim 5, wherein the sub-server compares the request number with a predetermined request number to obtain the datum from the storage unit accordingly.

7. The management server as claimed in claim 5, wherein the management server outputs the datum through the load balancing unit or the sub-server.

8. An operation method of a management server, comprising:
    receiving a request signal from a client, wherein the request signal has a request number;
    distributing the request signal to a sub-server in response to the request number;
    obtaining a datum by the sub-server from a storage unit in response to the request number, wherein the storage unit corresponds to the sub-server; and
    outputting the datum according to the request number, wherein the datum stored in the storage unit is a portion of all data which are stored in a database of the management server;
    comparing the request number with a predetermined request number;
    obtaining the datum by the sub-server from the storage unit according to the request number when the request number is equal to the predetermined request number; and
    returning to the step of receiving the request signal when the request number is not equal to the predetermined request number.

* * * * *